Patented Dec. 19, 1944

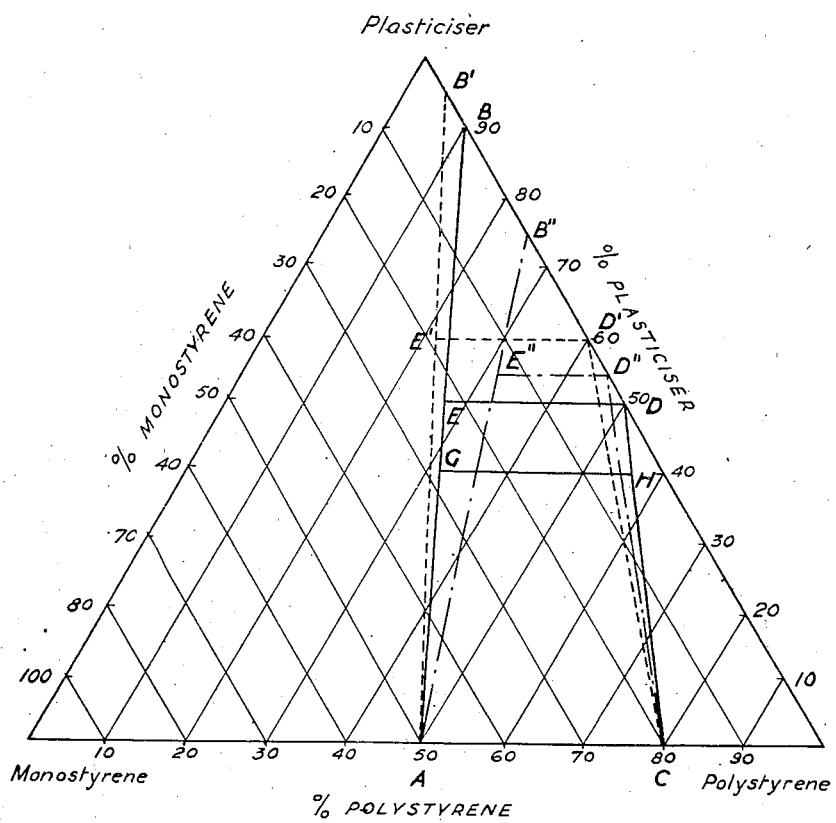

2,365,646

UNITED STATES PATENT OFFICE 2,365,646

ELECTRIC INSULATING MATERIAL

Archibald Alan New, Stanley George Foord, and Dudley Robert Beckwith, London, England, assignors to International Standard Electric Corporation, New York, N. Y.

Application September 16, 1942, Serial No. 458,598
In Great Britain October 31, 1941

6 Claims. (Cl. 117—122)

This invention relates to electric insulating materials and more particularly to tapes impregnated with solid or viscous liquid insulating material.

The well known sticky tapes used for electrical insulation purposes, made with a cotton fabric base and compounds comprising rubber, rubber resin, bitumens, waxes, resin, vegetable oils and the like, do not have particularly good electrical properties, especially under very humid conditions and/or at high frequencies such as are used for radio communication. Their widespread use is based mainly on their convenience combined with moderate electrical properties, and they suffer from what, in some circumstances, is a defect in that when exposed to the air they oxidise and lose their tackiness without, however, having more than a slight gain in hardness of the covering formed.

For some purposes a tape which is sticky when applied but will harden subsequent to application is desirable. It is the object of the present invention to provide such a tape which will in addition have excellent insulating properties even at high frequencies.

It has been proposed to build up a body of insulation around a cable joint or the like by lapping paper tapes impregnated with polystyrene and basting the tapes at intervals during the lapping operation with monomeric styrene. It has also been proposed to cover a cable joint with acetylated cotton tape impregnated with a rubber-polystyrene mixture and to cause this latter mixture to swell by coating it with a lacquer consisting of polystyrene dissolved in monostyrene, which may contain a suitable plasticiser.

According to the present invention we provide a fibrous tape impregnated with a mixture containing a polymerized aromatic vinyl hydrocarbon and a monomeric aromatic vinyl hydrocarbon, in such proportions that the mixture is sufficiently viscous to render the tape sticky, when first used, but the whole gradually hardens with time.

The mixture with which the tape is impregnated may contain rubber, a polymerized aromatic vinyl hydrocarbon, such as polystyrene, and between 10% and 50% of a monomeric aromatic vinyl hydrocarbon capable of polymerisation such as monostyrene.

Such a tape is sticky because of the action of the monomer in swelling the rubber and the polymer and can be lapped over an article to be insulated, e. g. a power cable joint without the use of further adhesive.

Percentages of the monomer below the lower limit stated above are insufficient to swell the rubber and polymer satisfactorily, whilst if percentages above the higher limit stated are used the mixture is insufficiently viscous and may flow away from the tape.

As an example, tape composed of acetylated cotton, preferably having between 30% and 60% combined acetic acid content, is impregnated with the mixture of rubber, polystyrene, polyisobutylene and polyethylene described in British Patent 534,464 and prepared as therein described. This mixture contains 51.6% polystyrene, 23.2% crêpe rubber, 21.4% polyisobutylene and 3.8% polyethylene. The tape is impregnated by any well-known method such as spreading, or rolling or frictioning on hot calender rolls. The tape so impregnated is not sticky. It is kept in rolls until shortly before it is required for use. It is then passed through a bath containing monostyrene during a time of immersion of 15 seconds during which it takes up monostyrene to the extent of 20% of the mixture originally in the tape. The tape is rewound after passage through the bath and during a period of several weeks it remains sticky (if kept in airtight containers) and capable of being unwound to be rewound round an article to be insulated.

Other examples according to the invention comprise fibrous tapes impregnated with mixtures of monostyrene and polystyrene, or with mixtures of monostyrene, polystyrene and a nonpolymerisable plasticiser for polystyrene. In order that a tape should be sticky, the viscosity of the mixture with which it is impregnated should not be less than $10^3$ poises and as the tape in accordance with the invention must be sticky at room temperature, the impregnating mixture should have a viscosity of not less than $10^3$ poises at room temperature, i. e. 20° C. Also the viscosity of the impregnating mixture must not exceed $10^6$ poises at 20° C. This figure is approximate since it is very difficult to measure viscosities in the neighbourhood of this figure, but a viscosity of $10^6$ poises approximately is the upper limit for a tape impregnated therewith to be sticky. Another criterion is that the tape must harden with time by polymerisation of the monostyrene, i. e. the viscosity of the mixture must become greater than $10^6$ poises at room temperature and preferably much greater.

The precise composition of a mixture of monostyrene, polystyrene and non-polymerisable plasticiser for polystyrene as impregnant of a fibrous tape according to the invention depends upon the viscosity of the said plasticiser and also upon its plasticising effect upon polystyrene but the following description taken in conjunction with the accompanying drawing will show how impregnants may be chosen in order to fulfill the desired criteria. The drawing is in the form of the triangular diagram commonly used when dealing with mixtures of three components. The left point of the base represents monostyrene, the right point polystyrene, and intermediate points mixtures of monostyrene and polystyrene. A mixture represented by point A is 50% monostyrene 50% polystyrene and has a viscosity of $10^6$ poises. A mixture represented by point C is 20% monostyrene and 80% polystyrene and has a viscosity of $10^6$ poises approximately. Consequently any mixtures represented by points on the line AC inclusive of A and C are suitable as impregnants of tape according to the invention. These mixtures gradually harden with time so that the mixtures at times after being formed are represented by points on the base to the right of the original point, the point representing the mixture moving with time until it coincides with the right end of the base 100% polystyrene.

The vertex of the triangle represents 100% non-polymerisable plasticiser and points in the triangle outside the base represent mixtures of monostyrene, polystyrene and non-polymerisable plasticiser. The viscosity of the mixture represented by any such point depends, as stated above, upon the viscosity of the plasticiser and upon its plasticising effect.

For the case of a polymerised alpha methyl styrene having a viscosity of 30 centipoises at 20° C., point B (i. e. 90% plasticiser 10% polystyrene) represents a mixture which has a viscosity of $10^3$ poises at 20° C. and point D (50% plasticiser 50% polystyrene) a mixture which has a viscosity of $10^6$ poises approximately at 20° C. Any point on line AB represents, for this particular plasticiser, a mixture having a viscosity of $10^3$ poises at 20° C. and any point on line CD, a mixture having a viscosity of $10^6$ poises, approximately at 20° C. A mixture represented by any point such as E, within the triangle will gradually alter in composition (and viscosity) with time in such a way that the mixtures at times after being first formed are represented by points situated successively to the right on the horizontal line through the point representing the first formed composition. A mixture represented by point E eventually becomes a mixture represented by point D, by polymerisation of the monostyrene. Thus the line ED is one limit of the area within which mixtures that are impregnants of tape according to the invention must lie, and this area is that of the figure AEDC (when the above mentioned polymerised alpha methyl styrene is used as non-polymerisable plasticiser). Preferably, in order that the mixture should with time attain a viscosity much greater than $10^6$ poises, the limiting line of the area should be GH, parallel to ED through a point H on CD representing a composition containing approximately 5% monostyrene.

The effect of the use of a plasticiser for polystyrene of a different viscosity but similar plasticising effect to the plasticiser above mentioned upon the composition of mixtures to be used as impregnants of tapes according to the invention may be seen from another example. The points B' and D' represent mixtures of polystyrene and a polymerised alpha methyl styrene viscosity of 100 poises at 20° C. that have viscosities of $10^3$ and approximately $10^6$ poises at 20° C. respectively. Thus if polymerised alpha methyl styrene of a viscosity of 100 poises is used, mixtures to be used as impregnants of tapes according to the invention are represented by points in the area AE'D'C. Preferably also the boundary line is drawn parallel to E'D' and nearer to the base of the triangle (so as to include only mixtures that harden to a viscosity much greater than $10^6$ poises) in the same manner as previously explained.

The slopes of the lines AB, AB', CD and CD' take into account the fact that monostyrene is a much better plasticiser for polystyrene than any other plasticiser, so that for example a mixture of 50% monostyrene, 50% polystyrene has a viscosity of $10^3$ poises, but to attain an equally low viscosity with a mixture of polymerised alpha methyl styrene and polystyrene, at least 90% of the former is necessary.

Other plasticisers that may be used in carrying out the present invention are purified ethyl oleate or any of the plasticisers for polystyrene used according to British Patent 490,814. As an example of one of the latter plasticisers, alpha isoamylnaphthalene may be taken, and as this has a viscosity of about 30 centipoises at 20° C. this example will illustrate the effect upon the composition of mixtures to be used in impregnating tape according to the invention of the different plasticising effect of different plasticisers. Referring again to the drawing the point B" represents a mixture of alpha isoamylnaphthalene 75% and polystyrene 25% that has a viscosity of $10^3$ poises at 20° C. and point D" represents a mixture of the same two substances that has a viscosity of approximately $10^6$ poises. This last mentioned mixture contains 45% polystyrene. Thus mixtures of monostyrene, polystyrene and alpha isoamylnaphthalene that may be used for impregnating tapes according to the present invention fall within the area AE"D"C on the diagram. Preferably the boundary line of this area is drawn below E"D" in the manner already explained.

The above examples are correct for polystyrene of molecular weight of 80,000 to 100,000 but polystyrenes of other molecular weights may be used with corresponding changes in the limiting compositions. Moreover polystyrene in any of the above examples may be replaced by a mixture of polystyrene and rubber or by any other polymerised aromatic vinyl hydrocarbon or by a mixture of a polymerised aromatic vinyl hydrocarbon and another polymerised substance, with corresponding changes in the limiting compositions.

The tape according to examples described with reference to the drawing may be prepared by any of the following methods, the precise method to be adopted and the time of impregnation according to any of the methods being dependent upon the viscosity of the impregnant at the temperature employed during the impregnation. The methods which may be used are (a) direct impregnation of the tape in roll form with the mixture at elevated temperatures and either with or without pressure difference to force the mixture into the roll, (b) direct impregnation of a roll with monostyrene or a mixture of monostyrene plus one of the plasticisers mentioned at ordinary temperatures followed by heating for sufficient time to cause the required proportion of monostyrene to polymerise, (c) rolling or frictioning the mixture into the tape or (d) passing a tape containing polystyrene or a mixture of polystyrene and non-polymerisable plasticiser through a bath of monomeric styrene or a bath containing a mixture of monomeric styrene and a non-polymerisable plasticiser.

Tape so prepared may be wound into rolls and if kept in air tight containers will retain its stickiness for some months sufficiently to enable it to be unwound and rewound round an article to be insulated.

Tapes made in accordance with the present invention have all the convenience of application of well known sticky tapes and have better electrical properties particularly at high humidities and at radio frequencies. The lappings of tape adhere together to produce a unitary structure which is immediately waterproof and thereafter gradually harden to a solid mass by polymerisation of the monomer used and aided to some extent by evaporation also. Instead of the usual black shade of present sticky tapes, a wider range of colouring is possible with tapes according to the invention. Indeed if rubber is not used, tapes according to the invention can be made of any desired colour, by the use of coloured tapes as the fibrous base and/or by the addition of small amounts of suitable dyes or pigments to the impregnating materials.

What is claimed is:

1. Fibrous tape impregnated with a mixture containing a polymerized aromatic vinyl hydrocarbon and a monomeric polymerizable aromatic hydrocarbon, said monomeric hydrocarbon being present in a proportion between about 10% and about 50% of said polymerized hydrocarbon, producing a sticky tape that hardens upon polymerization of said monomeric hydrocarbon.

2. Fibrous tape as set forth in claim 1 in which the mixture contains rubber.

3. Fibrous tape impregnated with a mixture containing polystyrene and monomeric styrene, said styrene being present in a proportion between about 20% and about 50% of said polystyrene, producing a sticky tape that hardens upon polymerization of said monomeric styrene.

4. Fibrous tape as set forth in claim 3 in which the mixture contains rubber.

5. Fibrous tape as set forth in claim 3 in which the mixture includes a plasticizer, the viscosity of the mixture at room temperature being between about $10^3$ poises and about $10^6$ poises.

6. Fibrous tape impregnated with a mixture of 51.6% polystyrene, 23.2% rubber, 21.4% polyisobutylene, 3.8% polyethylene and monostyrene to the extent of 20% of the said mixture.

ARCHIBALD ALAN NEW.
STANLEY GEORGE FOORD.
DUDLEY ROBERT BECKWITH.